United States Patent [19]

Aboutboul et al.

[11] 3,978,002

[45] Aug. 31, 1976

[54] CATALYST USEFUL FOR OLEFIN POLYMERIZATION PROCESS

[75] Inventors: Henri A. Aboutboul, Brussels, Belgium; William Kirch, Clinton, Iowa; Jerome H. Krekeler, Cincinnati, Ohio

[73] Assignee: National Petro Chemicals Corporation, New York, N.Y.

[22] Filed: July 9, 1974

[21] Appl. No.: 486,788

Related U.S. Application Data

[63] Continuation-in-part of Ser. No. 311,579, Dec. 4, 1972, which is a continuation of Ser. No. 122,502, March 9, 1971, abandoned, which is a continuation of Ser. No. 750,467, Aug. 6, 1968, abandoned, Continuation-in-part of Ser. No. 294,270, Oct. 10, 1972, abandoned, which is a continuation of Ser. No. 70,622, Aug. 14, 1970, abandoned, which is a continuation-in-part of Ser. No. 750,733, Aug. 6, 1968, Pat. No. 3,652,214, and a continuation-in-part of Ser. No. 750,734, Aug. 6, 1968, Pat. No. 3,652,215, and a continuation-in-part of Ser. No. 766,693, Oct. 11, 1968, Pat. No. 3,652,216, Continuation-in-part of Ser. No. 326,645, Jan. 26, 1973, which is a continuation of Ser. No. 148,117, May 28, 1971, abandoned, which is a continuation of Ser. No. 750,734, Aug. 6, 1968, Pat. No. 3,652,215.

[52] U.S. Cl. ............................... 252/456; 252/458; 252/459

[51] Int. Cl.$^2$ ...................... B01J 29/16; B01J 29/00

[58] Field of Search.................... 252/456, 458, 459

[56] References Cited

UNITED STATES PATENTS

| | | | |
|---|---|---|---|
| 3,050,514 | 8/1962 | Cawthon, Jr. et al. | 260/94.9 |
| 3,281,405 | 10/1966 | Hogan | 252/458 X |
| 3,349,067 | 10/1967 | Hill | 260/88.2 |
| 3,534,110 | 10/1970 | Juquin et al. | 252/459 X |

*Primary Examiner*—Carl F. Dees
*Attorney, Agent, or Firm*—Kenneth D. Tremain

[57] ABSTRACT

An olefin polymerization catalyst comprising a silica xerogel support having a pore volume greater than about 2.0 cc/g, the major portion of which volume is provided by pores having pore diameters ranging from 300 to 600 A and a surface area ranging from 200 to 500 m$^2$/g, and having deposited thereon a metal-containing catalytic material, such as chromium oxide, or other metal oxide. Further, a polymerization process utilizing such a catalyst for the preparation of polyolefins having relatively low molecular weights and high melt indexes without loss of catalyst activity, especially a process for the preparation of polymers and copolymers of 1-olefins having a maximum of 8 carbon atoms in the chain and having no branching nearer the double bond than the 4-position, e.g., ethylene polymers.

6 Claims, No Drawings

CATALYST USEFUL FOR OLEFIN POLYMERIZATION PROCESS

CROSS REFERENCES TO RELATED APPLICATIONS

This application is a continuation-in-part of co-pending application Ser. No. 311,579 filed Dec. 4, 1972 which, in turn, is a continuation of abandoned application Ser. No. 122,502 filed Mar. 9, 1971 and which, in turn, was a continuation of abandoned application Ser. No. 750,467 filed Aug. 6, 1968.

Further, this application is a continuation-in-part of copending application Ser. No. 294,270 filed Oct. 10, 1972 which, in turn, is a continuation of abandoned application Ser. No. 70,622 filed Aug. 14, 1970 and which, in turn, was a continuation-in-part of each of applications Ser. Nos. 750,733 filed Aug. 6, 1968 (now U.S. Pat. No. 3,652,214), Ser. No. 750,734 filed Aug. 6, 1968 (now U.S. Pat. No. 3,652,215), and Ser. No. 766,693 filed Oct. 11, 1968 (now U.S. Pat. No. 3,652,216).

This application is also a continuation-in-part of copending application Ser. No. 326,645 filed Jan. 26, 1973 which, in turn, is a continuation of abandoned application Ser. No. 148,117 filed May 28, 1971 and which, in turn, was a continuation of the aforesaid application Ser. No. 750,734 filed Aug. 6, 1968.

BACKGROUND OF THE INVENTION

1. Field of the Invention

This invention relates to a catalyst useful in a process for the polymerization of 1-olefins having a maximum of 8 carbon atoms in the chain and having no branching nearer the double bonds than the 4-position. The catalyst is formed on a silica xerogel support having a cumulative pore volume, pore diameter distribution, and surface area such that relatively low molecular weight, high melt index polyolefins are readily produced in particle form polymerizations carried out therewith.

2. The Prior Art

In recent years new processes and catalysts for the stereospecific polymerization of olefins have received considerable attention. Catalysts having stereospecific activity include metal-containing catalytic materials, e.g., chromium oxides, deposited on silica, or alternatively alumina, supports which have previously been activated by oxidation at elevated temperatures. Olefins may be polymerized with such catalysts to produce a varied series of polymers having differing molecular weights and melt indexes, depending upon the particular temperatures, pressures, solvents or other diluents, catalysts, or other reaction conditions used.

For many applications the production of low molecular weight, high melt index polymers is of particular advantage, such materials finding important applications in films and sheets, extrusion coating, injection and rotational molding, and the like. Considering the preparation of ethylene polymers as illustrative, low molecular weight (high melt index) polyethylenes are commercially obtained by carrying out the polymerization in solution (the "solution process"), but only with conversions of less than about 1000 pounds of polyethylene per pound of supported catalyst (equivalent to $\geqslant 10$ ppm as Cr on a polymer basis as Cr content of supported catalyst is $\geqslant 1\%$). On the other hand, when the reaction is carried out in suspension (the "suspension" or "particle form" process), it is possible to obtain conversions of from about 5000 to 15000 pounds of polyethylene per pound of supported catalyst having Cr content of $\leqslant 1\%$ (equivalent to $\leqslant 2$ ppm Cr on a polymer basis). Moreover, it is necessary in the solution process, in order to preserve the color and desired appearance of the product resin, to maintain the chromium content in the resin lower than about 2.5 ppm. The catalyst must, therefore, be removed from the polymer product formed in the solution process. The catalyst need not, however, be so removed during particle form processing. The particle form process thus exhibits distinct commercial advantages relative to the solution process for the stereospecific polymerization of olefins.

Heretofore, however, particle form or slurry operations have been limited, at high conversion rates equal to or greater than about 5000 pounds of polyethylene per pound of catalyst, to the production of polyolefins having melt indexes lower than about 2. Various techniques have been proposed to increase the melt indexes of olefin polymers so produced, with varying degrees of success. For example, while the use of modifier such as hydrogen has been found to decrease the molecular weight and increase the melt index of the polymer product, the advantages attendant the use of such materials are limited since they simultaneously decrease catalyst activity. Similarly, variation of the chromium oxide content of the catalyst, addition of different metal oxide promoters, combination of different supports and/or the use of varying catalyst activation temperatures, have been widely investigated, with only marginal improvement.

Modification of the porosity, surface area and other characteristics of the catalyst support has also been suggested as a means for increasing the melt index of olefin polymers produced by particle form stereospecific polymerization reactions. Thus, in recent years a number of procedures have been described in the literature for the preparation of silica gel materials said to be useful as catalyst supports for this purpose. Such procedures are described, for example, in U.S. Pat. Nos. 3,132,125 and 3,225,023; and in British Pat. Specification No. 1,007,722. Silica gels so prepared have not, however, achieved their intended purpose, i.e., the production of olefin polymers having markedly increased melt indexes.

Thus, for example, Schwander et al U.S. Pat. No. 3,132,125 describes the use in both solution and suspension processes of stereospecific catalysts supported on non-porous silicas for the production of polyolefins said to have relatively low average molecular weights and, correspondingly, high melt indexes. Relatively high melt index polymers were in fact produced in the solution phase operations exemplified by Schwander et al. Where, however, particle form operations were utilized use of the catalyst described in this patent resulted in the preparation of polymer products having melt indexes (estimated from the molecular weight data set forth by Schwander et al) no greater than about 0.2.

Hogan et al U.S. Pat. No. 3,225,023, assigned to Phillips Petroleum Company, suggests that olefin polymers having increased melt indexes may be produced employing catalyst supports having increased average pore diameters, ranging from about 60 to 400 A. Hogan et al illustrate their process by experimental runs (which may have been conducted in either the solution or suspension phases), employing "commercial silica gel" supports having varying average pore diameters. The use of silica gels of the type commercially available as of the Hogan et al filing date (November, 1962) and having the indicated range of average pore diameters has not, however, resulted in the formation of very high melt index polymers employing particle form operations. Thus, polyethylenes so produced (employing chromium oxide catalysts deposited on such supports) have melt indexes of only up to about 3.0.

British Pat. Specification No. 1,007,722, also assigned to Phillips Petroleum Company, describes the use of "a specific form of high purity finely divided porous silica gel" as a support for a chromium oxide catalyst said to be capable of producing relatively high melt index polyethylenes in a particle form polymerization. The specific form of silica gel referred to in the British specification is a silica aerogel having a pore diameter between approximately 200 A and 500 A, a surface area of approximately 250 to 350 m²/g, a density of less than approximately 0.2 g/ml., and an oil adsorption of approximately 300/100 lbs. "Syloid" 244 (having a surface area of 250 m²/g, a pore volume of 2.2 cc/g, and a pore diameter of 350 A) is the sole such material exemplified.

Aerogels are silica gels in which the liquid phase has been replaced by a gaseous phase in such a way as to avoid shrinkage as occurs by direct evaporation of the liquid phase thereof (materials prepared in the latter manner being termed xerogels); Iler, *The Colloid Chemistry of Silica and Silicates*, Cornell University Press, pages 137 and 152. Aerogels are, however, subject to subsequent shrinkage when wetted due to coalescence of their ultimate particles. Shrinkage of this nature decreases porosity and markedly impairs the use of these materials as stereospecific catalyst supports. Moreover, aerogels readily disintegrate when subjected to mechanical stress. Thus, it has been found that the use of silica aerogels as catalyst supports in the particle form process is less than satisfactory.

Nor have other recently disclosed silica gel materials having varying porosity and surface area characteristics proved adequate to effect the production of high melt index olefin polymers in particle form operations. Such materials are disclosed, for example, in U.S. Pat. Nos. 2,731,326; 3,403,109; 3,428,425; and 3,669,624; and in British Pat. Specification No. 1,077,908.

As illustrative, Hyde U.S. Pat. No. 3,453,077, and British Pat. Specification No. 1,077,908, both of which are assigned to W. R. Grace and Co., disclose methods said to result in the preparation of "microspheroidal silica gels" having pore volumes within the range of from as low as 0.3 cc/g (the British specification) to as much as 2.5 cc/g (the U.S. Patent), and surface areas within the range of from 100 to 800 m²/g. These references describe procedures for the preparation of silica gels involving gelling alkali metal silicate solutions with gaseous carbon dioxide or mineral acids, neutralizing either about half (the British specification) or substantially the entire alkali metal silicate content of the hydrogels thus formed, aging the neutralized gels (and, in the case of the U.S. patent, making the gel pH alkaline with ammonium hydroxide), thereafter spray-drying the hydrogel to remove the liquid phase, washing the spray-dried material and re-drying the same for subsequent use. It has, however, been found that these procedures do not enable one to prepare silica gel materials having cumulative pore volumes as large as 2.0 cc/g. Moreover, when silica gels thus made are used as supports for stereospecific catalysts in the particle form polymerization of ethylene, polyethylenes having melt indexes of only up to about 2 are obtained.

From the preceding it will be seen that prior efforts to produce relatively high melt index olefin polymers in particle form operations by the use of modified silica gel catalyst supports and/or other techniques have not been entirely satisfactory. It is, therefore, a principal object of the present invention to provide an improved silica gel-supported stereospecific catalyst useful in the particle form polymerization of olefins to produce polymers having substantially higher melt indexes than heretofore obtained in such operations. Other objects and advantages of the present invention will be apparent from the following description of the nature and preferred embodiments of the improved catalyst and polymerization process utilizing the same.

SUMMARY OF THE INVENTION

In accordance with the present invention an improved olefin polymerization catalyst is provided useful in the particle form polymerization of 1-olefins, particularly ethylene. The catalyst comprises a silica xerogel support having a metal-containing catalytic material deposited thereon. The silica xerogel has a pore volume greater than 1.96 cc/g, i.e., greater than about 2.0 cc/g, the major portion of which pore volume is provided by pores having average pore diameters within the range of from about 300 to 600 A; and a surface area within the range of from about 200 to 500 m²/g. The pore volume of the xerogel is suitably provided by pores having a narrow pore diameter distribution primarily within the indicated 300 to 600 A range. The metal-containing catalytic material deposited on the support is preferably a metal oxide, especially chromium oxide or another metal oxide such as cobalt, nickel, vanadium, molybdenum or tungsten oxides. It has been found that a stereospecific catalyst comprising the specified silica xerogel support having the indicated cumulative pore volume, average pore diameter and surface area characteristics is quite effective in particle form olefin polymerizations in producing olefin polymers having markedly higher melt indexes than heretofore obtained.

The polymerization process in which such catalyst is useful involves contacting a 1-olefin having a maximum of 8 carbon atoms in the chain and no branching nearer the double bond than the 4-position (preferably ethylene) with the catalyst under polymerization conditions to provide the indicated high melt index, low molecular weight polyolefin products.

For example, employing the novel catalyst of the present invention polyethylenes may thus be readily produced with melt indexes in excess of 2.0, and up to about 15.

Preferably, the silica xerogels employed in the catalyst hereof have cumulative pore volumes ranging from about 2.0 to 3.5 cc/g, with about 70% or more of the pore volume being provided by pores having an average pore diameter within the approximate 300 to 600 A range. Use of such materials as supports for chromium oxide-containing catalysts, for example, results in the formation of polyethylenes having particularly advantageous, high melt indexes ranging from about 3 to 12.5.

The silica xerogel supports of the catalyst of the invention, and particularly the porosity and surface area characteristics thereof, are described in terms of their pore volumes (PV), surface areas (SA), and average pore diameters (PD). The surface area is determined by the standard BET method described by Brunauer, Emmett and Teller, J.Am.Chem.Soc., 60, 309 (1938). The pore volume is determined by the well known nitrogen adsorption-desorption technique described, for example, in *Catalysis*, Vol. II, pages 111-116, Emmett, P. H., Reinhold Publishing Corp., New York, New York, 1955 (Run to a P/Po of 0.967 which is equivalent to 600 A pore diameter) and elsewhere. The pore volumes referred to herein refer to the gel volumes determined by permitting nitrogen gas to be adsorbed by and condensed in the pores of the gel at the normal boiling point of liquid nitrogen and at some relative pressure P/Po, wherein P is the pressure of the nitrogen vapor over the gel and Po is the vapor pressure of liquid nitrogen. For silica gels, the determination of this nitrogen pore volume at a relative pressure P/Po = 0.967 permits computation of the volume of those pores having diameters of up to 600 A, which principally contribute to the gel surface phenomena. The average pore diameter may be calculated from this data as follows:

$$\overline{PD}(A) = \frac{4\ PV\ (cc/g)}{SA\ (m^2/g)} \times 10^4$$

It should further be understood that, as used herein, "pore volume" and "cumulative pore volume" are synonymous, and refer to the total volume of the pores which comprise the xerogel structure per unit weight thereof. Similarly, the terms average or mean "pore diameter" or "pore size" are used interchangeably herein, and refer to a one-point representation of an actual distribution calculated by the above formula which is based on the geometric model of a right circular cylinder.

The pore volume of the xerogel catalyst support hereof should be contrasted with the water pore volume measurement occasionally used for the evaluation of silica gels and determined in accordance with the method of Innes, Analytical Chemistry, 28, 332-4 (1956). The latter method gives a result which sums the pore volume in all pores from the very smallest through the macro-pores, or 0 to >1500 A diameter. This is in contrast with the $N_2$ adsorption method which when run to a P/Po of 0.967 sums the pore volume in pores from 0-600 A diameter (i.e., micro-pores). Such a method (i.e., the water pore volume) is, therefore, not discriminating enough for measuring the pore volume of the silica xerogels hereof, the major portion of which is provided by pores having pore diameters within the range of from about 300 to 600 A. For such materials it is rather necessary to determine pore volume by measurement of the volume of liquid nitrogen adsorbed per gram of the dry gel in accordance with the technique known in the art (see also Barrett, Joiner, and Halenda, J.Am.Chem.Soc., 73, 373 (January, 1951).

The silica xerogels employed in the supported catalyst of the invention are prepared in accordance with the methods disclosed in the aforesaid U.S. Pat. Nos. 3,652,214; 3,652,215; and 3,652,216; and the respective continuation-in-part applications thereof, applications Serial Nos. 191,977; 191,978; and 192,134, now U.S. Pat. Nos. 3,794,712; 3,794,713; and 3,801,705, respectively. The methods described in the noted prior disclosures (which are incorporated herein by this reference) involve the following steps for preparation of the silica xerogel:

1. Precipitating a silica hydrogel, under conditions of good agitation, by neutralizing an aqueous alkaline silicate solution, e.g., with a strong acid, a weak acid such as $CO_2$, an ion exchange resin, or by other suitable means to produce a silica hydrogel slurry, employing the following conditions:
    a. the neutralizing medium is added to the aqueous alkaline silicate solution at a rate such that the gel point of the solution is reached in from about 30–120 minutes, e.g., at a rate of up to 40% of the needed amount in 30–120 minutes and the remaining 60% in from about 20–90 minutes more,
    b. the temperature during precipitation is maintained between about 0° and 17° C,
    c. the $SiO_2$ concentration in the final slurry is between about 5 and 12 percent by weight, and
    d. the final pH of the hydrogel slurry is from pH 3–8;
2. Maintaining the hydrogel slurry at a pH within the range of ph 3–8 at a temperature and for a time sufficient to strengthen the hydrogel structure;
3. Reducing the concentration of the alkaline material in the hydrogel by washing the same with a liquid which displaces the alkaline material, until the wash liquor recovered contains less than about 20 ppm of the alkaline material, expressed as salt thereof; and
4. Drying the resulting product, either by vacuum freeze-drying (specifically as described in the aforesaid Patent No. 3,652,214 and the continuation-in-part thereof, Ser. No. 191,977, [Patent No. 3,794,712]), solvent displacement (specifically as described in the aforesaid U.S. Pat. No. 3,652,215 and the continuation-in-part thereof Ser. No. 191,978 [Patent No. 3,794,713]), or azeotropic distillation (specifically as described in the aforesaid U.S. Pat. No. 3,652,216 and the continuation-in-part thereof, Ser. No. 192,134 [Patent No. 3,801,705]).

The metal-containing catalyst material can be deposited on the silica xerogel support thus formed in any suitable manner. For example, the silica xerogel base can be coated with a metal oxide by shear mixing the finely ground metal oxide with the silica base at room temperature. When chromium oxide is selected as the metal-containing catalyst, 0.5% to 5% by weight and preferably from 1% to 3% by weight based on the total weight of the supported catalyst, may be deposited on the xerogel support. Similar results can be obtained by blending the metal oxide and the carrier under vacuum conditions and/or under a nitrogen atmosphere at 200°C. Activation of the catalyst is carried out in air in a fluidized bed at temperatures between about 1500° and 2000° F, and preferably at about 1825° F. The period set for activation is on the order of from 2 to 10 hours and preferably about 6 hours at the foregoing temperatures conditions. The activation is accomplished without any physical change in the carrier.

The supported catalyst, e.g., a chromium oxide supported on the silica xerogel support having the indicated characteristics, is suitably employed in the particle form polymerization of 1-olefins having a maximum of 8 carbon atoms in the chain and no branching nearer to the double bond than the 4-position to prepare either homopolymers or copolymers of two or more 1-olefins of the foregoing type. In either case, the particle form reaction is effected in a manner known per se as described, for example, in Hogan et al U.S. Pat. No. 2,825,721.

PREFERRED EMBODIMENTS OF THE INVENTION

As indicated hereinabove, use of the silica xerogel-supported catalyst hereof in particle form polymerization results in the formation of unique polymer products; in the case of the polymerization of ethylene with chromium oxide-silica xerogel catalysts, polyethylenes are produced having low molecular weights, evidenced by melt indexes of between about 2 to 15, and low chromium levels, less than about 2.5 ppm chromium (without removing catalyst residues from the system). Preferred embodiments of catalysts and polymerization techniques useful therewith may be found in the following examples, which are intended as illustrative only:

EXAMPLE I AND CONTROL A

Preparation of Polyethylenes with Catalysts of the Invention as Compared with Use of Prior Art Catalysts This example is directed to the preparation of ethylene homopolymers as described in the aforesaid application Ser. No. 750,467, now abandoned. The supported catalysts of Examples I-1, I-2, and I-3 were prepared and utilized in the particle form polymerization of ethylene in the manner described in Examples 2 (Examples I-1 and I-2 hereof) and 3 (Example I-3) of the aforesaid application. The control supported catalysts A-1 through A-4 were commercially available "M.S. Catalysts" comprising pre-formed chromium oxide (2.1%) on silica xerogels, activated and employed in the particle form polymerization reaction as described in Examples 1 (Controls A-1 through A-3) and 3 (Control A-4) of the aforesaid Ser. No. 750,467.

In Examples I-1, I-2 and I-3 the respective silica xerogel catalyst supports were prepared as follows:

10,080 g of sodium silicate solution containing 28.7% $SiO_2$ and 8.9% of $Na_2O$ was added to 12,720 g of water and cooled to 5° C., under agitation.

11,200 g of $H_2SO_4$ (12.75 wt. %) was then added as follows:

(a) 4480 g was added at a constant rate over a period of one hour, and (b) the remainder was added over a period of 45 minutes. The final pH of the precipitate was 6.2 and the $SiO_2$ content was about 8.5%.

The slurry was then heated to 95° C and held at that temperature for 3 hours. The gel was washed with a solution of 1113 g of $NH_4NO_3$ in 45 gallons of water, and then with de-ionized water until the filtrate titrated less than 20 ppm $Na_2SO_4$.

The product was reslurried in acetone and washed with acetone until the water in the acetone titrated less than 1%.

The product was then homogenized and the acetone distilled off to reduce the acetone content to less than 1% by weight.

The silica gel obtained was calcined in an oven at 1000° F for 4 hours before evaluation. The physical properties of the silica xerogel thus obtained were: pore volume (PV) = 2.66 cm³/g surface area (SA) = 307 m²/g and an average pore diameter (Av.PD.) = 347 A. The xerogel was coated with 2.1% $CrO_3$, to have a chromium level comparable to the commercially available "M.S. Catalysts".

The coating was done by adding 813 g. of dry xerogel support and 16.45 g of dry powdered chromium oxide into a ribbon blender. A vacuum of 28″ of mercury was drawn on the blender and heat was applied so as to obtain a temperature of 250° C in 3 hours. The heat was maintained for 2 hours, and the catalyst was then brought to room temperature and stored in air-tight containers.

Portions of the catalysts thus prepared were calcined in a fluidized bed using air flow rates of 0.2 feet³ per minute in an activator having a 4-inch diameter. The catalysts were thus activated at temperatures of 1750° F (Example I-1), 1825° F (Example I-2), and 1800° F (Example I-3). The respective maximum temperatures were maintained for 6 hours, after which the individual catalysts were stored under nitrogen until used.

The thus activated catalysts were utilized in the particle form polymerization of ethylene within an 88 gallon loop reactor. Ethylene monomer, isobutane solvent and the respective catalysts were fed continuously into the reactor to maintain ethylene saturation at 5% ± 1% and solids between 15 and 25 percent. The reactor temperature was maintained at about 230°–233° F, the reactor pressure at 650 psig, and the polyethylene-containing slurry formed within the reactor was circulated therethrough at a rate of from 15–25 feet per second. The polyethylenes thus produced were recovered and their melt indexes [by ASTM D-1238-65T (Condition E)], annealed densities and ash contents were determined.

The properties of the silica gel catalyst supports and the activated catalysts, and the polymer properties obtained in the particle form polymerization are set forth in Table I below for each of Examples I-1, I-2 and I-3.

Control experiments A-1 through A-4 were carried out to compare the properties of polyethylenes produced employing the conventional "M.S. Catalysts". 250 g samples of the M.S. Catalysts were calcined in a fluidized bed at activation temperatures of 1600° F (Control A-1), 1700° F (Control A-2), 1800° F (Control A-3), and 1550° F (Control A-4). The thus activated control catalysts were stored under nitrogen until ready for use, their pore volumes, pore diameters and surface areas were determined, and they were employed in the particle form polymerization in the same manner as aforesaid. The properties of the activated M.S. Catalysts and the polymer properties obtained therewith are additionally set forth in Table I.

The polymerization of Example I-3 and Control A-4 were carried out in the presence of a hydrogen modifier (hydrogen concentration, mole ratio of $H_2/Et$ = 1 × $10^{-2}$). As will be noted from Table I, higher polymer melt indexes were obtained in the presence of the modifier. It will, however, further be noted that both in the polymerizations conducted with and without the modifier, substantially higher polymer melt indexes were achieved utilizing the supported catalysts of the present invention having the pore volume, pore diameter and surface area characteristics defined hereinabove, as compared with the M.S. Catalysts.

TABLE I

COMPARATIVE PROPERTIES OF POLYETHYLENES PRODUCED EMPLOYING CATALYSTS OF THE INVENTION AND CONTROL CATALYSTS

| | Silica Gel Properties | | | Activated Catalyst Properties | | | Polymer Properties | | |
|---|---|---|---|---|---|---|---|---|---|
| Example | PV (cm³/g) | Av.PD (A) | SA (M²/g) | Pore Volume (cm³/g) | Average Pore Diameter (A) | Surface Area (cm³/g) | Milled MI | Annealed Density | Ash ppm |
| I-1 | 2.66 | 347 | 307 | 2.14 | 340 | 252 | 3.2 | 0.9645 | 164 |
| I-2 | 2.66 | 347 | 307 | 2.23 | 356 | 251 | 4.2 | 0.9647 | 184 |
| Control | | | | | | | | | |
| A-1 | — | — | — | N.A. | N.A. | N.A. | 1.3 | — | 211 |
| A-2 | — | — | — | 1.44 | 225 | 226 | 1.8 | — | 184 |
| A-3 | — | — | — | 1.25 | 259 | 193 | 1.6 | — | 330 |
| Polymerization Carried Out with Hydrogen Modifier | | | | | | | | | |
| Example | | | | | | | | | |
| I-3 | 2.66 | 347 | 307 | 2.20 | 347 | 253 | 12.2 | 0.9668 | 305 |
| Control | | | | | | | | | |
| A-4 | — | — | — | 1.55 | 260 | 234 | 3.2 | 0.9699 | 238 |

EXAMPLES II AND III AND CONTROLS B AND C

Preparation of Ethylene Copolymers with Catalysts of the Invention as Compared with Use of Prior Art Catalysts Ethylene copolymers were produced in the presence of chromium oxide-supported catalysts prepared as described in Example I and Control A above, the control experiments employing the aforesaid M.S. Catalysts. In Example II and Control B the respective catalysts were activated at 1800° F (Example II) and 1700° F (Control B), and were then utilized in the copolymerization of ethylene with hexene-1 (0.5 wt. %) at about 220° F (Example II - 221.5° F; Control B - 223° F). The properties of the respective xerogels and catalysts employed, and the ethylene-hexene copolymers obtained are set forth in Table II below.

In Example III and Control C the respective catalysts were activated at 1800° F (Example III) and 1550° F (Control C) and were then utilized in the copolymerization of ethylene with about 1.5 wt. % butene-1 (Example III — 1.6%; Control C — 1.7%) at about 215° F (Example III — 215° F; Control C — 213° F). The properties of the respective xerogels and the catalysts embodying the same, and the ethylene-butene copolymers obtained therewith, are also set forth in Table II.

It will be seen from Table I and II that use of the stereospecific catalysts hereof in ethylene particle form polymerizations produces polymers having significantly greater melt indexes than polymers obtained utilizing prior art silica gel-supported catalysts, at the same activity levels.

It will be understood that various changes may be made in the catalyst compositions and polymerization techniques exemplified hereinabove without departing from the scope of the present invention. Accordingly, the preceding specification is intended as illustrative only, and not in a limiting sense.

What is claimed is:

1. An olefin polymerization catalyst comprising a metal-containing catalytic material deposited on a silica xerogel support, said silica xerogel having
   a. a nitrogen pore volume greater than 1.96 cc/g and up to 2.90 cc/g, said pore volume being equal to the volume of the pores in said gel having pore diameters of up to 600 A and being determined as that volume of nitrogen adsorbed by and condensed in the pores of said gel per gram of the dry gel at the normal boiling point of liquid nitrogen and at a relative pressure P/Po equal to 0.967 wherein P is the pressure of the nitrogen vapor over the gel and Po is the vapor pressure of liquid nitrogen;
   b. the major portion of said nitrogen pore volume being provided by pores having pore diameters within the range of from 300–600 A; and
   c. a surface area within the range of from 200–500 m²/g.

2. The olefin polymerization catalyst of claim 1, wherein said metal-containing catalytic material is a metal oxide selected from the group consisting of an

TABLE II

COMPARATIVE PROPERTIES OF ETHYLENE COPOLYMERS PRODUCED EMPLOYING CATALYSTS OF THE INVENTION AND CONTROL CATALYSTS

| | Silica Gel Properties | | | Activated Catalyst Properties | | | Polymer Properties | | |
|---|---|---|---|---|---|---|---|---|---|
| | PV₃ (cm³/g) | AV.PD (A) | SA (m²/g) | Pore Volume (cm³/g) | Average Pore Diameter (A) | Surface Area (cm³/g) | Milled MI | Annealed Density | Ash (ppm) |
| Production of Ethylene-Hexene-1 Copolymers | | | | | | | | | |
| Example II | 2.66 | 347 | 307 | 2.48 | 330 | 305 | 4.0 | 0.956 | 250 |
| Control B | — | — | — | 1.44 | 225 | 226 | 1.0 | 0.956 | 150 |
| Production of Ethylene-Butene-1 Copolmers | | | | | | | | | |
| Example III | 2.66 | 347 | 307 | 2.12 | 235 | 242 | 2.50 | 0.9430 | 72 |
| Control C | — | — | — | 1.60 | 213 | 300 | 0.14 | 0.9425 | 70 | oxide of chromium, cobalt, nickel, vanadium, molybdenum, and tungsten.

3. The olefin polymerization catalyst of claim 2, wherein said metal oxide is chromium oxide in an amount of from 0.5 to 5 percent by weight, based on the total weight of the supported catalyst.

4. The olefin polymerization catalyst of claim 1, wherein the nitrogen pore volume of the silica xerogel support is within the range of from 2.35 cc/g to 2.90 cc/g.

5. An olefin polymerization catalyst comprising a metal-containing catalytic material deposited on a silica xerogel support, said silica xerogel having the following characteristics:
 a. a nitrogen pore volume greater than 1.96 cc/g and up to 2.90 cc/g, said pore volume being equal to the volume of the pores in said gel having pore diameters of up to 600 A and being determined as that volume of nitrogen adsorbed by and condensed in the pores of said gel per gram of the dry gel at the normal boiling point of liquid nitrogen and at a relative pressure $P/P_o$ equal to 0.967 wherein P is the pressure of the nitrogen vapor over the gel and $P_o$ is the vapor pressure of liquid nitrogen;
 b. the pore volume of the xerogel being provided by pores having a narrow pore diameter distribution primarily within the range of from 300–600 A; and
 c. a surface area within the range of from 200–500 $m^2/g$.

6. The olefin polymerization catalyst of claim 5, wherein said metal-containing catalytic material is chromium oxide in an amount of from 0.5 to 5 percent by weight, based on the total weight of the supported catalyst.

* * * * *